F. M. SHEETS.
NUT LOCK.
APPLICATION FILED AUG. 14, 1917.
1,314,433.
Patented Aug. 26, 1919.
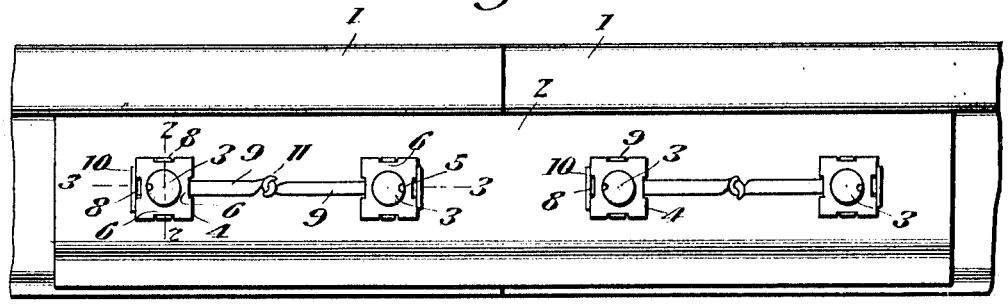
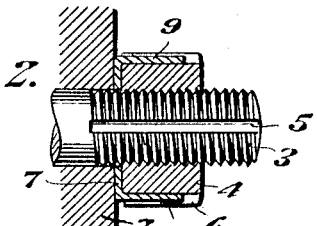
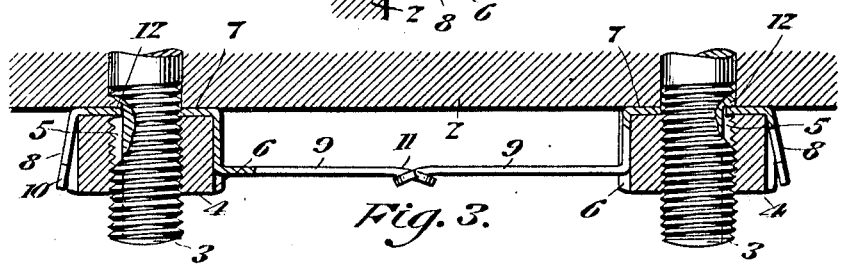
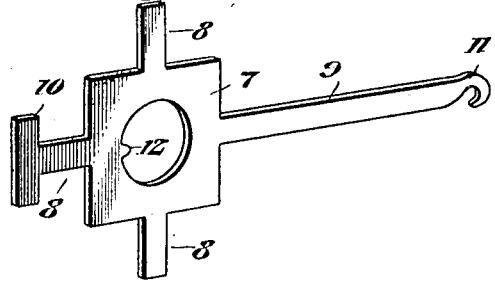
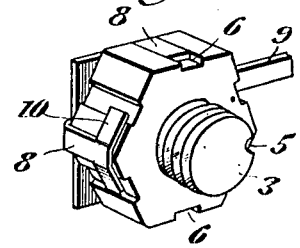
WITNESSES
INVENTOR
F. M. Sheets
BY Victor J. Evans
ATTORNEY

UNITED STATES PATENT OFFICE.

FRED M. SHEETS, OF KANSAS CITY, MISSOURI.

NUT-LOCK.

1,314,433.　　　　Specification of Letters Patent.　　Patented Aug. 26, 1919.

Application filed August 14, 1917. Serial No. 186,153.

*To all whom it may concern:*

Be it known that I, FRED M. SHEETS, a native-born citizen of the United States, residing at Kansas City, in the county of Jackson and State of Missouri, have invented new and useful Improvements in Nut-Locks, of which the following is a specification.

The present invention relates to improvements in means for locking a nut upon a bolt.

In carrying out my invention, it is my purpose to provide a grooved nut with a washer having a lug engaging in the groove of the said nut and having peripheral bendable fingers, a nut being screwed upon the bolt and having its sides slotted whereby to receive the fingers upon the washer when the same are bent against the nut.

It is a further object of the invention to provide a nut lock in the nature of a washer, having bendable fingers, one or more of the said fingers having lateral extensions, the said fingers being designed to be bent against the sides of a nut, and the lateral extensions being designed to also engage with the sides of the nut and to be bent around the corners of the said nut, whereby to more effectively retain the washer upon the nut.

It is a still further object of the invention to produce a nut locking means primarily designed for use upon rail joints and comprising washer members having bendable fingers designed to be brought into contact with the sides of the nuts, each of said washers, in addition to the said fingers, having extending portions formed with hook shaped ends, the said ends of the adjacent washers designed for interlocking engagement whereby all the series of washers will be held connected in nut engaging position.

With the foregoing objects and others which will appear as the nature of the invention is more fully understood, the improvement resides in the construction, combination and operative arrangement of parts set forth in the following description and pointed out with particularity in what is claimed.

In the drawings,

Figure 1 is a side elevation of a rail joint having the nuts thereof locked in accordance with the present invention.

Fig. 2 is a sectional view approximately on the line 2—2 of Fig. 1.

Fig. 3 is a sectional view approximately on the line 3—3 of Fig. 1.

Fig. 4 is a perspective view of one of the washer members.

Fig. 5 is a perspective view illustrating the arrangement of the washer member on a hexagon nut.

In the accompanying drawings, I have illustrated my improvement as applied with the nuts and bolts of a rail joint, but it is to be understood that the improvement is not to be thus restriced in its useful application, as the same may be employed in locking nuts upon bolts in many other instances.

Referring now to the drawings in detail, 1—1 designate two railway rails having abutting ends and retained in alinement through the medium of fish plates 2, bolts 3, passing through openings in the webs of the rails and in the fish plates, and nuts 4 being screwed home upon the bolt.

The bolts, may have their threaded shanks grooved longitudinally as indicated by the characters 5, and the nuts have all of their sides depressed as indicated by the numerals 6.

Before the nuts are screwed home upon the bolts, I arrange upon the said bolts in contacting relation with the fish plates, two locking members constructed in accordance with this invention, each of the same comprising a metallic washer 7, having peripheral bendable extensions 8—8 and 9, the said extensions being in the nature of fingers and of a width to be snugly received in the depressions 6. The fingers 8 have their ends provided with lateral extensions 10, the said extensions being designed to be brought into contact with the sides of the nut opposite the depressions 6, and, if desired, to be brought around the corners of the said nuts, as when hexagonal nuts are employed and as illustrated by Fig. 5 of the drawings. The locking members, as disclosed in Fig. 3 of the drawings, are struck from a flat piece of material, the fingers 8 being bent at a substantially right angle to the body of the washer 7, the extension 9 is likewise bent at its juncture with the body of the washer, and thereafter projected outward from the washer in a plane parallel thereto. The extensions 9 have their ends hooked as at 11 and the said extensions 9 of the adjacent washer member 7 extending from each other, whereby the hooked ends thereof may be brought to engage with each other, and consequently, locking all of the series of washers together. This is an important feature of the invention, inasmuch as should one of the nuts have a tendency to turn in an unscrewing direction, such movement would be retarded by the locking engagement of the washer upon the nut adjacent thereto, while also the arrangement permits of the ready insertion of the respective washers upon the respective nuts and bolts. Each of the washers may be provided with a lug 12 entering the opening receiving the bolts and engaging in the grooves 5 of the said bolts, so that the washer may be thus locked to the bolt.

Having thus described the invention what I claim is:

In combination with plates, bolts passing therethrough to connect the same, locking nuts on said bolts having their sides depressed, of a locking washer on each of the bolts between the plates and nuts for the bolts, each of said washers comprising a substantially square body portion having its edges formed with bendable fingers, said fingers designed to be bent at a substantially right angle with respect to the body of the washer to enter the depressions in the sides of the nut, one of said fingers having a lateral bendable extension, the finger diametrically opposite said last mentioned finger being of a greater length than the remainder and being further bent and extended outward of the nut in a plane substantially parallel to the body of the washer, the extensions of the fingers of the oppositely disposed washers on the nuts being directed toward each other and the ends of the said extensions being hooked and designed to co-engage one with the other.

In testimony whereof I affix my signature.

FRED M. SHEETS.

Copies of this patent may be obtained for five cents each, by addressing the "Commissioner of Patents Washington, D. C."